Patented July 22, 1941

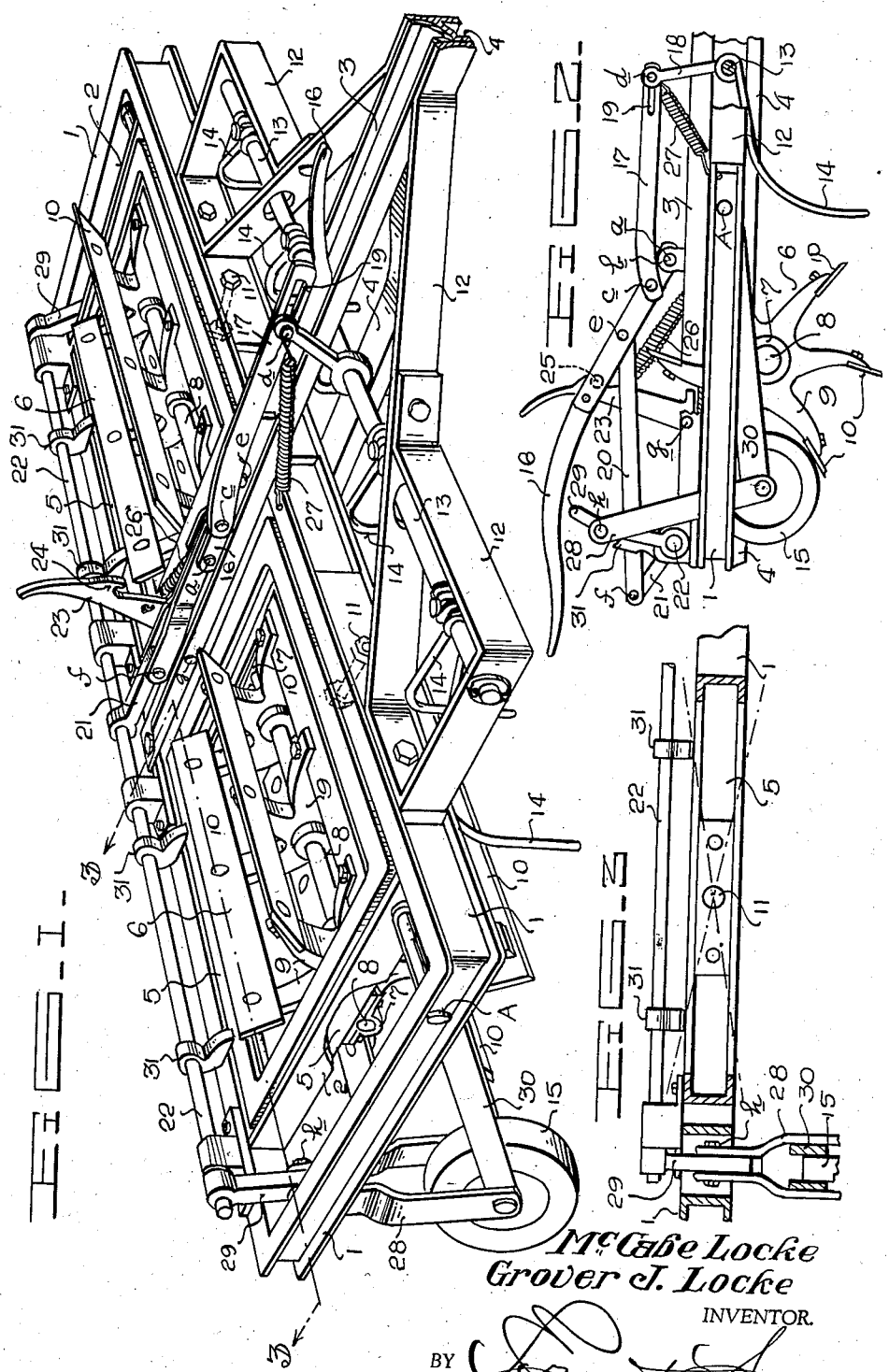

2,250,103

UNITED STATES PATENT OFFICE 2,250,103

STALK CUTTING MACHINE

McCabe Locke and Grover J. Locke, Dallas, Tex., assignors of one-third to C. H. Ferguson, Dallas, Tex.

Application July 20, 1940, Serial No. 346,494

5 Claims. (Cl. 55—61)

This invention relates to agricultural implements and more particularly to stalk cutters.

The principal object of the present invention is to provide a stalk cutter having dual rotary cutters mounted in a common frame and themselves mounted in individual frames for pivotal movement in a direction transverse to their axes of rotation.

Another object of the invention is to provide for ready transportation of the machine by virtue of wheels supporting the frame and cutters when the latter are not in use and a novel lifting mechanism by which the weight of the frame may be transferred from the wheels to the cutters themselves and vice-versa, which mechanism is likewise effective in locking the pivotal frames of the cutters against pivotal movement when the frame is supported upon its wheels.

Another object of the invention is to provide means actuated also by the lifting mechanism, arranged to be operatively disposed forwardly of the cutters by pre-arranging the stalks for cutting, that is to say, disposing the same in a plane transverse to the direction of travel of the machine so that the cutters may effectively act thereon.

With the foregoing objects as paramount, the invention has particular reference to its salient features of construction and arrangement of parts which will become manifest as the description proceeds, taken in connection with the accompanying drawing, wherein:

Figure 1 is a perspective view of a machine constructed according to the present invention.

Figure 2 is an elevational view of the machine, reduced in size, and in which the wheel lifting mechanism is shown in operative position, and Figure 3 is a fragmentary detail view on line 3—3 on Figure 1, showing the pivotal feature of the individual cutter frames.

Continuing with a more detailed description of the drawing, I designates the main frame of the machine which is preferably constructed of channel iron. Adjacent either end of the frame and extending from one side or the other are transverse braces 2.

Midway between the ends of the rectangular main frame I and superimposed thereon in transverse relation thereto is a channel member 3. This channel member 3, and the parallel channel member 4 therebelow, comprises first a mounting for the lifting mechanism, to be described later, and a means for pulling the machine by draft animals or tractors, it being observed that the forward ends of the two channel members converge toward the front of the machine.

Arranged in end to end relationship in the main frame are frames 5, adapted to carry the individual rotary cutters 6. Disposed under the ends of each of these frames 5 are bearings 7 (Figure 1) in which are journaled the ends of cutter shaft 8. Each shaft is provided with spaced spiders 9 having blades 10.

Each individual frame 5 is mounted to the main frame I by means of bolts 11, disposed in transverse relation to the longitudinal axes of the frames 5 so that each frame will be capable of tiltable movement in a plane at right angles to the direction of travel of the machine. Obviously, this feature enables the cutter to effectively operate over irregular terrain, producing much better results than if the two cutters were rigid with the main frame. Moreover, this feature materially adds to the effectiveness of the cutter when operating on two rows of stalks, for which the machine has been designed, in view of the irregularities of the mounds or hills in which the stalk originated.

Disposed forwardly of the frame I are straps 12, so formed as to provide a brace for the tongue portion of the machine as well as a bearing or support for a shaft 13, situated forwardly and in longitudinal relation to the front of the frame I. This shaft carries a plurality of rakes 14, extending inwardly toward the frame I and downwardly to engage the stalks and arrange them in right angular relationship to the axes of the cutters, when the latter are in operative position. When the shaft 13 is rotated, these rakes will be moved into and out of operative position. The same mechanism, which will be presently described, is effective to rotate the shaft as well as to manipulate the wheels 15 of the machine into and out of operative position.

Referring now particularly to the lifting means above referred to and by which the shaft 13 and wheels 15 are manipulated, attention is directed primarily to a hand lever 16. One end of the lever 16 is pivoted at $a$ to a bearing $b$, affixed to the channel member 3.

Pivoted at $c$ to a point adjacent the pivot point $a$ of the hand lever 16 is an arm 17, the latter extending forwardly of the machine and pivoted at $d$ to a link 18 which is in turn secured to the shaft 13. It will be noted, however, that the pivotal point $d$ between the arm 17 and the link 18 is a slidable one, by virtue of the slot 19 in the end of arm 17. The purpose of this sliding engagement will be made evident presently.

The pivot end of the hand lever 16 is bifurcated and to this bifurcated part of the lever is pivoted an arm 20 at e. This arm 20 extends rearwardly of the machine and is pivoted at f to a link 21, affixed to a shaft 22, extending the length of the frame 1, at its rear end and in parallel relationship thereto. At latch 23 is pivoted at g to the channel member 3 and is provided with a hook portion 24 which, when the lever 16 is operative to retract the wheels 15, engages the pin 25, shown only in Figure 2 in dotted lines. The latch 23 is normally under the tension of the spring 26 and, when the elements are in the position shown in Figure 2, this spring 26 holds them in such position. Another spring 27 is provided at the front of the machine, having one end connected to the frame 1 and the opposite end connected to the upper end of the link 18 so that the shaft 13, when the elements are in the position shown in Figure 2, will be constrained to rotate to urge the rakes 14 into engagement with the ground. At this point, it may be mentioned that due to the displacement of the arm 17 the slot 19 is necessary in its end since the rearward movement thereof is greater than the movement required of the link 18 to properly actuate the shaft 13.

When the lever 16 is moved from the forward position shown in Figure 1 to the rearward position shown in Figure 2, not only will the shaft 13 be rotated to lower the rakes 14 but the rear shaft 22 will likewise be rotated in the same direction through the provision of the arm 20 and the link 21 secured to said shaft 22. When such rotation of the shaft 22 occurs, the wheel supporting forks 28 in either end of the shaft 22 will be actuated due to the pivot connection at h therewith of links 29 which are in fixed relation to the ends of the shaft 22. Wheel braces in the form of parallel arms 30 are provided, which arms have their ends joined to the axle of each wheel and pivotally connected at their opposite ends to the forward portion of the frame at A.

Operating simultaneously with the movement of the link and lever assembly described are members 31, affixed to the shaft 22 in relative opposite relation. Obviously, when the shaft 22 is rotated in a counter-clockwise direction, regarding the machine as in Figure 2, the forward ends of the members 31 will be raised to the position shown in Figure 2, thereby releasing the cutter frames 5 to pivotal movement about points 11. It will be understood that with the locking members 31 in this position, the cutters are each resting on the ground in support of the frame, with the wheels in retracted position.

In operation, the implement is transported to the field with the wheels 15 in the position shown in Figure 1. When it is desired to operate the cutters 6, the hand lever 16 is pulled upward and rearward, the spring 27 assisting in such operation. The arm 20 is pushed rearwardly and the arm 17 pulled by such manipulation of the hand lever 16. Obviously, shaft 22 is rotated in a counter-clockwise direction to perform the dual function of elevating the wheel mountings and raising members 31 out of engagement with the cutter frames 5. Simultaneously, shaft 13 carrying the rakes 14 is similarly rotated to lower these hooks into contact with the stalks. With the wheels 15 raised, the entire weight of the structure is supported on the cutters 6. The lever 16 is latched with its hook 24 in engagement with the pin 25 carried by the lever 16.

Manifestly, the construction as shown and described is capable of some modification and such modification as may be construed to fall within the scope and meaning of the appended claims is also considered to be within the spirit and intent of the invention.

What is claimed is:

1. A stalk cutting machine comprising a main frame and a pair of sub-frames carrying rotary cutters operative on individual shafts in said sub-frames in axial relationship, said sub-frames being pivoted intermediate their ends to said main frame to rotate on axes in transverse relation to the major axis of said main frame, a wheel mounting situated on either end of said main frame carrying wheels and capable of retraction, a shaft disposed forwardly of said main frame in parallel relation thereto, rakes carried by said shaft and movable therewith, a shaft rearwardly of said frame, lugs carried by said latter shaft arranged to overlie said sub-frames to lock the same against pivotal movement during inoperative periods of said rotary cutters, means connecting said latter shaft with said wheel mountings and means carried by said main frame for effecting simultaneous rotation of said rake and lug shafts to alternate the positions of said cutters and wheels with respect to the ground and to similarly actuate said rakes.

2. A stalk cutter comprising a main frame and a pair of sub-frames pivoted across their minor axes to said main frame in transverse relation to the latter's major axis, rotary cutters mounted on shafts longitudinally journalled in each of said sub-frames, wheel mountings at either end of said main frame, each carrying a wheel, a shaft carried by and in parallel relation to the rear of said main frame for actuating said wheel mountings to raise and lower said wheels, lugs carried by said shaft to overlie said sub-frames to secure the same against pivotal displacement when said wheels are operative, a second shaft forwardly of said main frame carrying rakes forwardly of said cutters and means carried by said main frame for effecting simultaneous rotation of said lug and rake shafts.

3. A stalk cutting machine comprising a main frame and a pair of sub-frames pivoted to said main frame on axes in transverse relation to the longitudinal axis of said main frame, rotatable cutters mounted in each of said sub-frames, a retractable wheel mounting at either end of said main frame, wheels carried thereby and inoperative to support the machine when said cutters are operative, means carried by said main frame to secure said sub-frames against pivotal movement when said wheels are in operative position, rakes mounted forwardly of said main frame and means carried by said main frame for actuating said wheel mountings, sub-frame securing means and said rakes simultaneously.

4. A machine for cutting plant stalks comprising independent rotary cutters mounted for pivotal movement in a main frame across the major axis of the latter, wheels at either end of said main frame in support of the latter during inoperative periods of the cutters, retractable mountings therefor, means arranged to be moved into and out of engagement with the mountings of said cutters to secure and release the same against and for pivotal movement respectively, rakes disposed forwardly of said main frame and means carried by said main frame for actuating said wheel mountings, cutter mounting securing and releasing means and said rakes simultaneously.

5. A machine as set forth in claim 4 in which the actuating means for the wheel mountings, cutter mounting securing and releasing means is comprised of a hand lever pivoted intermediate the ends of the main frame, a forward shaft carrying said rakes, a rearward shaft connected with said wheel mounting and cutter mounting securing and releasing means, an arm connecting said forward shaft to said hand lever adjacent its pivot point and a second arm connecting said rearward shaft to said hand lever at a point spaced from the connection therewith of said first arm whereby oscillation of said hand lever will rotate said forward and rearward shafts simultaneously.

McCABE LOCKE.
GROVER J. LOCKE.